United States Patent

[11] 3,561,726

| [72] | Inventor | Frank M. Iannelli |
| | | 5 Penwood Road, Livingston, N.J. 07039 |
| [21] | Appl. No. | 800,113 |
| [22] | Filed | Feb. 18, 1969 |
| [45] | Patented | Feb. 9, 1971 |

[54] PLASTIC COUPLING
2 Claims, 7 Drawing Figs.

[52] U.S. Cl. .................................................. 251/149.6, 285/260; 251/149.7
[51] Int. Cl. .................................................. F16l 37/28
[50] Field of Search .................................. 251/149.4, 149.6, 149.7; 137/614.05, 614.04, 614.03; 285/260, 345, 423

[56] References Cited
UNITED STATES PATENTS

| 2,498,831 | 2/1950 | Veitch .......................... | 285/423X |
| 2,881,011 | 4/1959 | Coughlin ...................... | 251/149.4X |
| 3,389,923 | 6/1968 | Love, Jr. et al. ............... | 285/423X |

FOREIGN PATENTS

| 588,706 | 4/1925 | France .......................... | 251/149.4 |

*Primary Examiner*—William R. Cline
*Attorney*—Harry B. Rook

ABSTRACT: A coupling comprises two sections molded of polymeric plastic material which is tough and hard but possesses a small degree of elasticity, one section having a tubular interior frustoconical recess at one end with which mates an exterior frustoconical portion on one end of the other section, whereby said sections can be frictionally connected to each other with a fluid-tight joint and can be easily separated, by merely relatively rotating them and respectively pressing them together and pulling them apart. One or each section may have a spring closed valve that is opened when the sections are connected. Also, each section may have an integral element coactive with the element on the other section for separably locking the sections together.

PATENTED FEB 9 1971

3,561,726

INVENTOR.
Frank M. Iannelli
BY
ATTORNEY

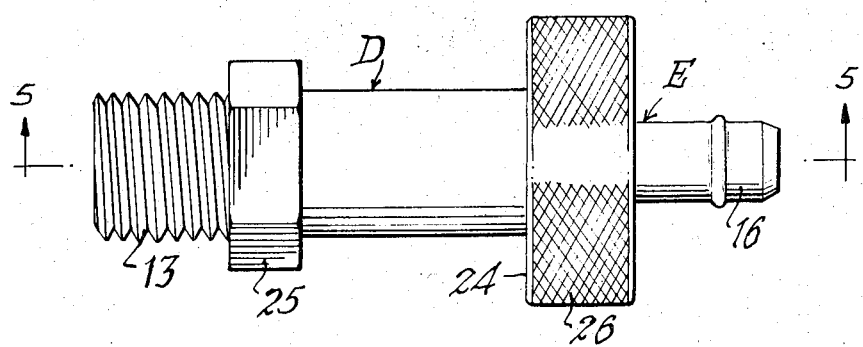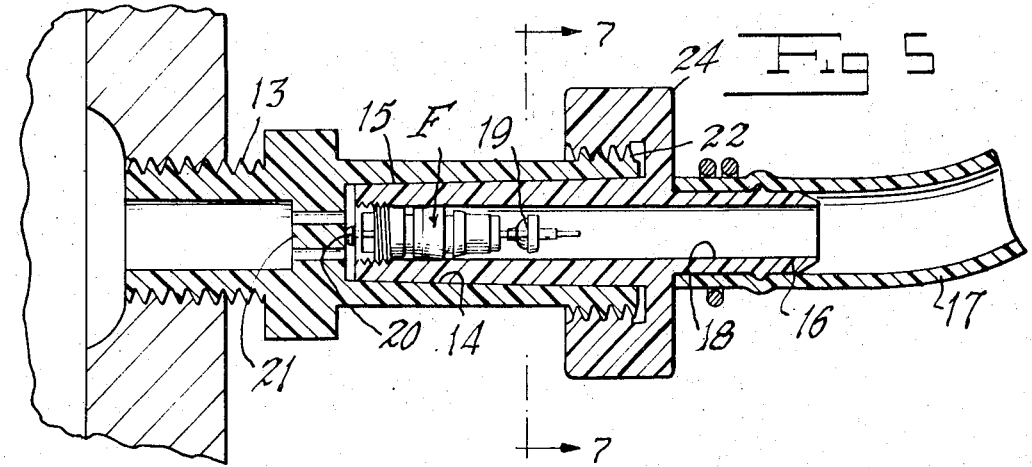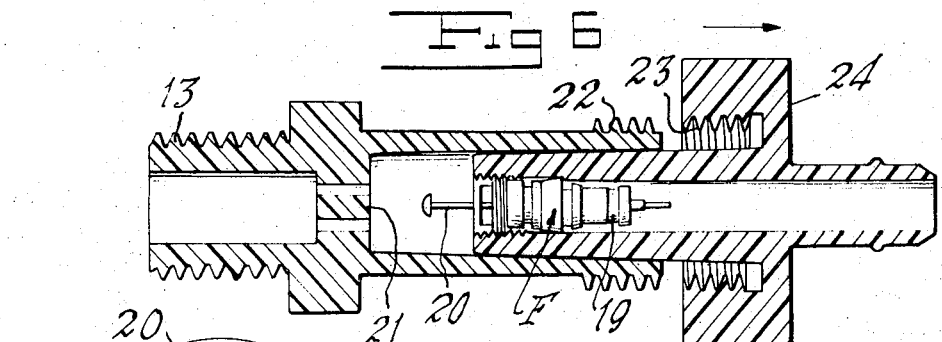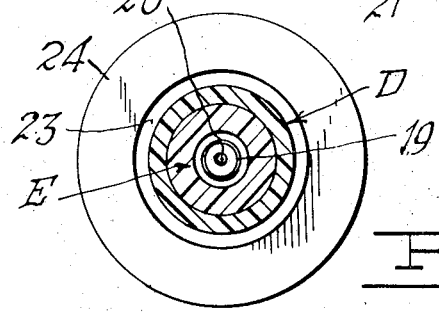
INVENTOR.
Frank M. Iannelli
BY
ATTORNEY

3,561,726

PLASTIC COUPLING

BACKGROUND OF THE INVENTION

1. Field of the Invention

The invention relates to a fitting or coupling for tubing and is especially adapted for separably connecting gas supply pipes to tanks, for example for introducing pressurized $CO_2$ into carbonating apparatus. More particularly, the invention is directed to a plastic coupling including two sections that are separably connected and one or each of which may have a spring closed valve therein.

2. Description of the Prior Art

U.S. Pat. No. 3,123,337 shows a coupling having plastic parts which have coacting tapered portions forming a valve for the passage through the sections, while U.S. Pat. No. 3,152,376 shows a coupling having two metal sections one of which carries a spring closed valve held open when the sections are connected.

Both of these prior art couplings require separable packing rings to form a fluid-tight connection and each coupling embodies a locking device comprising a plurality of elements separate from the sections, which is complicated and costly.

SUMMARY

One object of the present invention is to provide a coupling formed of two sections of molded polymeric plastic material which is tough and hard but possesses a small degree of elasticity, and to form the sections so that they may be separably connected to each other with a fluid-tight joint and without the necessity for separate or extra packing such as O-rings and without the necessity for grinding or specially forming the contacting surfaces of the sections.

The invention also provides one section with a tubular interior frustoconical recess at one end with which mates an exterior frustoconical portion on one end of the other section so that the sections can be frictionally connected to each other with a fluid-tight joint by merely relatively rotating the sections and simultaneously pressing them together.

Also contemplated by the invention is the provision of a spring closed valve in one or each of the sections which is opened when the two sections are connected together; and each section may be provided with an integral element coactive with the element on the other section for positively but separably locking the sections together.

BRIEF DESCRIPTION OF THE DRAWINGS

For a more complete understanding of the invention, reference should be had to the following description in conjunction with the accompanying drawings in which:

FIG. 4 is a view similar to FIG. 1 showing a modification of the invention;

FIG. 5 is a view similar to FIG. 2 showing the coupling in central longitudinal section approximately on the plane of the line 5-5 of FIG. 4, and illustrating the sections connected together with the valve open;

FIG. 6 is a similar view showing the coupling sections separated and illustrating the valve in closed position, and FIG. 7 is a transverse sectional view on the plane of the line 7-7 of FIG. 5.

DESCRIPTION OF THE PREFERRED EMBODIMENTS

Figure 1:
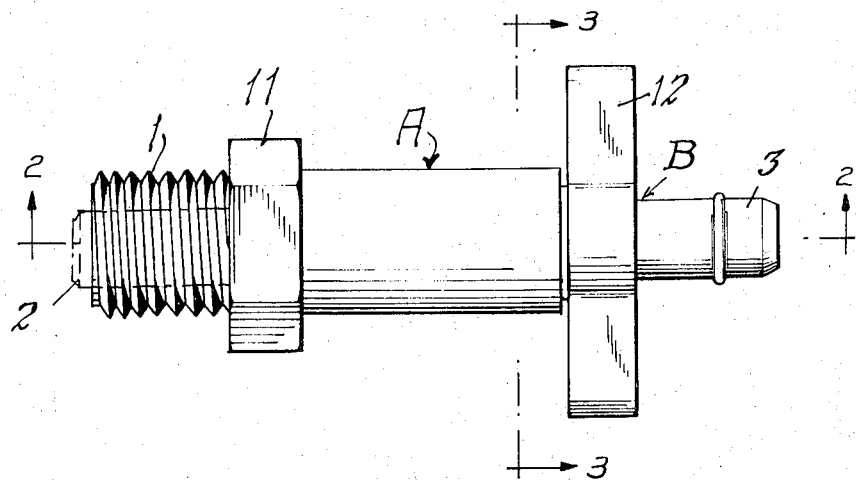
FIG. 1 is a side elevation of a coupling embodying the invention.
Figure 2:
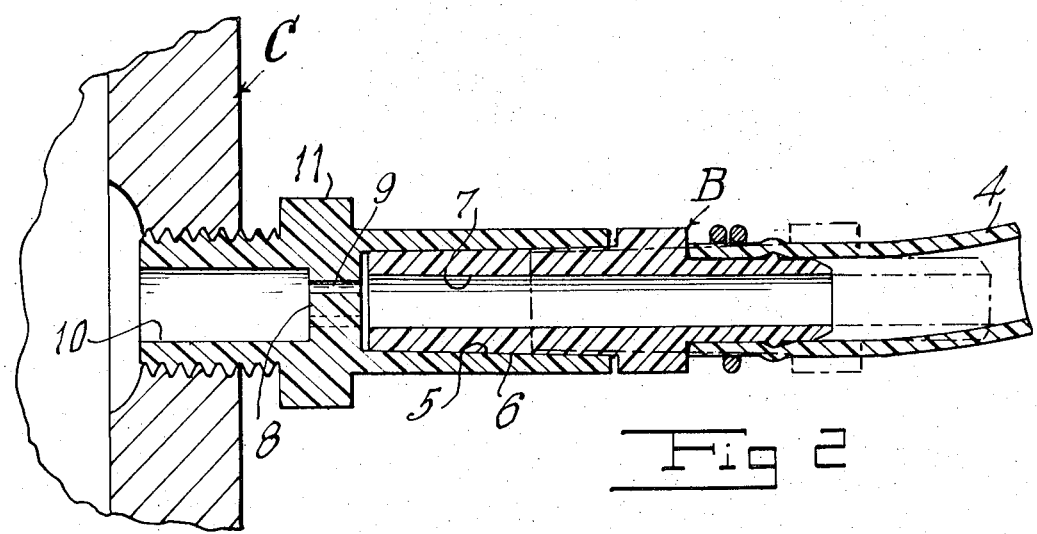
FIG. 2 is a vertical longitudinal sectional view through the coupling taken approximately on the plane of the line 2-2 of FIG. 1 and showing one section connected to a wall of a tank and the other section having a tube connected thereto.
Figure 3:
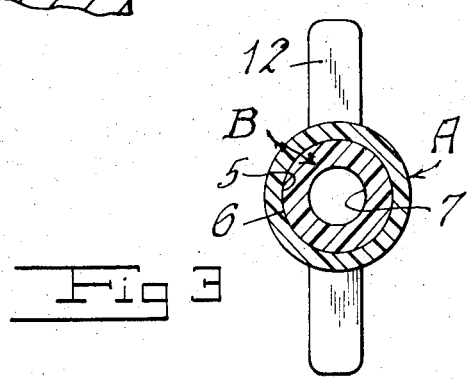
FIG. 3 is a transverse sectional view on the plane of the line 3-3 of FIG. 1.

Specifically describing the embodiment of the invention shown in FIGS. 1—3 inclusive, the reference characters A and B designate the main section and the secondary section, respectively of the coupling. One end of the main section is shown with a screw-threaded end portion 1 which may be screwed into the wall C of a tank as shown in FIG. 2, but instead of the screw-threaded portion, the section may have a nipple 2 similar to the nipple 3 at one end of the section B for the connection of a flexible tube which is shown in FIG. 2 and designated 4.

The other end portion of the main section A has an interior frustoconical recess 5 with which mates the exterior frustoconical portion 6 at one end of the secondary section B.

The section B has a central longitudinal passage 7 therethrough, and the section A is shown as formed with an intermediate wall 8 which has apertures 9 therethrough leading into a recess 10 opening through the end of the section.

The section A is shown as provided with a polygonal portion 11 and the section B is shown as provided with wings 12 which facilitate the gripping of the two sections for rotation thereof.

The sections are formed of polymeric plastic material which is tough and hard but possesses a small degree of elasticity, for example "Celcon" made by the Celanese Corp. or "Delrin," a product of the DuPont Corp.

The frustoconical surfaces 5 and 6 are molded with tapers so that upon pressing of the section B into the section A and simultaneously relatively rotating the sections, the sections are frictionally connected together with a fluid-tight joint, and the sections can be separated only by relatively rotating them and simultaneously pulling them apart as indicated by dot and dash lines in FIG. 2. When the sections are connected together as shown in FIG. 2, gas may flow freely from the tube 4 through the passages 7, 9 and 10 into the tank or other container to which the coupling is connected.

Referring now to FIGS. 4—7 inclusive, the coupling is shown as including a main section D and a secondary section E. The main section has a screw-threaded portion 13 corresponding to the portion 1 and also has an internal frustoconical recess 14 corresponding to the recess 5.

The secondary section has an end portion formed with an external frustoconical surface 15 which mates with the surface 14, and the section E also is shown with a nipple 16 for connection to the section of a flexible tube 17.

In this form of the invention, the central longitudinal passage 18 through the secondary section is controlled by a valve F of the well known tire valve type which includes a spring seated valve head 19 carried by a spring biased rod 20 which projects from one end of the valve casing when the valve is closed and the coupling sections are separated as shown in FIG. 6.

The two sections are connected together in the same manner as the sections A and B, and when the sections are connected the rod 20 abuts the perforated wall 21 at the inner end of the recess 14 of the main section so as to open the valve as shown in FIG. 5. It will be understood by those skilled in the art that the valve might be embodied in the main section D, if desired, and in some cases each section may have a valve the rod of which abuts the rod of the other valve so as to open both valves when the sections are connected together.

In many cases, particularly where a spring closed valve is embodied in the coupling, it is desirable to provide means for positively but separably locking the sections together. For this purpose, an integral multiple screw thread 22 may be provided on the exterior of the main section to coact with a mating internal multiple screw thread 23 formed in a flange 24 integrally molded coaxially on the section E.

The section D is shown with a polygonal portion 25 and the flange 24 may have a roughened or polygonal surface 26 to facilitate gripping of the sections for relative rotation. In connecting the sections, the section E is pushed into the section D and the sections are simultaneously relatively rotated so as to cause frictional fluid-tight engagement of the tapered surfaces 14 and 15 and at the same time interlock the threads 22 and 23. The threads may also be utilized for more tightly forcing the section E into the section D, and the threads will positively hold the sections against separation until they are relatively rotated in the opposite direction to unscrew the threads.

An important feature of the invention is that the plastic sections may relatively yield as they are pressed together so as to compensate for any irregularities that may be present and thereby insure a fluid-tight joint and a firm frictional connection of the sections.

I claim:

1. A coupling including a main section and a secondary section both formed of polymeric plastic material which is tough and hard but possesses a small degree of elasticity, the main section having a tubular interior frustoconical recess at one end and the secondary section having a passage therethrough and an exterior frustoconical portion adapted to mate with said frustoconical recess providing for frictional connection of said sections to each other with a fluid-tight joint and for separation of the sections upon pressing of the sections together and pulling them apart, respectively, while relatively rotating the sections, said main section having an exteriorly screw-threaded portion at the open end of said recess and said secondary section having an integral coaxial exterior flange provided with an internal screw thread to mate with said screw thread on the main section to positively but releasably lock the sections together.

2. A coupling as defined in claim 1 wherein the main section has a perforated wall at the inner end of said recess, and said secondary section has a passage therethrough and a spring closed valve in said passage having an actuating rod engageable with the perforated wall to open said valve when said sections are connected.